United States Patent

[11] 3,616,900

[72] Inventors Tom A. Cecil
 Highland Park, N.J.;
 Daniel A. Jacobs, Macon, Ga.
[21] Appl. No. 840,505
[22] Filed July 9, 1969
[45] Patented Nov. 2, 1971
[73] Assignee Engelhard Minerals & Chemicals Corporation
 Woodbridge, N.J.
 Continuation-in-part of application Ser. No. 690,423, Dec. 14, 1967, now abandoned.

[54] METHOD FOR BLEACHING GRAY KAOLIN CLAY
 10 Claims, No Drawings
[52] U.S. Cl. ................................................. 209/1,
 209/5, 209/166, 23/110 P, 106/72, 106/288 B
[51] Int. Cl. ................................................. B03b 7/00,
 C09c 1/42

[50] Field of Search ........................................... 209/5
 (166), 10, 3, 4, 9, 1; 23/110.2; 106/72, 288

[56] References Cited
 UNITED STATES PATENTS
 87,779  3/1869  Joy ............................... 8/101
 3,353,668  11/1967  Duke ............................ 209/161 X
 FOREIGN PATENTS
 1,420,612  11/1965  France ......................... 209/10

Primary Examiner—Frank W. Lutter
Assistant Examiner—Robert Halper
Attorneys—Melvin C. Flint and Inez L. Moselle ABSTRACT: Sedimentary gray kaolin clay containing relatively large amounts of iron and organic impurities is bleached by dispersing finely divided bubbles of ozone gas into a fluid, aqueous slip of the clay. The slip is acidified, flocculated, filtered and washed.

3,616,900

METHOD FOR BLEACHING GRAY KAOLIN CLAY

RELATED APPLICATIONS

This application is a continuation-in-part of our copending application Ser. No. 690,423, filed Dec. 14, 1967, now abandoned.

BACKGROUND OF THE INVENTION

Kaolin clay products must meet certain standards as to particle size, color, brightness and aqueous viscosity in order to be acceptable for use as pigments by the paper-coating industry. Sedimentary clays, as mined, do not meet these requirements on account of the iron and organic impurities present. Such clays therefore must undergo physical and chemical processing before they are suitable for such use. This is especially true of sedimentary kaolin clays which must meet brightness specification values of 90 percent or more.

The processing of all domestic sedimentary kaolins intended for paper coating use must include an effective bleaching treatment.

The bleaching should be carried out in aqueous media since the clay normally is obtained in the form of an aqueous slip after it undergoes other required wet-processing steps such as degritting, particle size classification and, in some cases, froth flotation beneficiation. Dry bleaching, as by a gas-solid contact process, is not adaptable to present-day clay-refining methods. The wet bleaching should be accomplished with minimal detriment to other properties of the clay. For example, when the clay is to be employed as a coating pigment the bleach should be effective without unduly increasing the viscosity of suspensions of the clay. Further, the bleach should be permanent.

It has been proposed to bleach clay containing carbonaceous impurities by subjecting the clay to the action of any one of several oxidizing agents. Examples of patents disclosing such processing are French Pat. No. 1,420,612 and U.S. Pat. No. 3,290,161 to Sheldon et al. However, when discolored clays include ferruginous impurities with or without carbonaceous matter, oxidation per se has not been considered to be a satisfactory method for bleaching. This is explained by the fact that iron (III) oxide compounds are colored and tend to be adsorbed and retained on dispersed fine clay. U.S. Pat. No. 1,588,956 to Feldenheimer discloses that bleached clay containing an iron impurity returns to its original color when treated with an oxidizing agent such as hydrogen peroxide but that the bleaching is permanent when a reducing bleach is used.

Prior art methods for bleaching iron-contaminated clays which include a treatment of the clay with an oxidizing agent invariably have followed such treatment with a step or steps to remove oxidized iron compounds from the clay or to reduce the iron compounds to colorless ferrous condition. An example of a process in which the oxidized iron compound (sulfate) is removed from iron-contaminated clay by leaching is U.S. Pat. 893,590 to Langenbeck. In the process described by Langenbeck the iron impurities in clay are first converted to sulfides and the sulfidized clay is then oxidized to form sulfates of Fe (II) and Fe (III). Simultaneously organic impurities are oxidized. The sulfates of iron are then leached from the clay with an acid solution or with water.

In the process described in Jap. Pat. No. 26/4512 ferruginous impurities which are oxidized along with organic impurities when ozone is incorporated into a slip of the dispersed clay are separated from the clay along with cations normally adsorbed on the clay by combined electrophoresis and electrodialysis. As described in this patent, oxidized iron compounds and metallic cations normally tend to adhere to fine clay when the clay is dispersed in the slip. The electrophoresis removes oxides of iron from dispersed negatively charged oxidized clay and the adsorbed cations are removed by the electrodialysis.

In the southeastern portion of the United States there exist vast deposits of a very fine sedimentary hard kaolin clay which has a distinctly gray color. The iron content of the clay is appreciably higher than that of the so-called white Georgia clays which have been used heretofore as the source of high-quality domestic clay-coating pigments. These clays also contain abnormally high proportions of discoloring organic impurities. The gray Georgia crudes are of great potential economic value as a result of the fact that reserves of the white crudes are dwindling. Moreover, refined kaolin from hard gray crudes has outstanding glossing properties when coated on paper.

Gray crudes were considered to be essentially unbleachable until it was discovered that they could be bleached by treatment with a strong oxidizing agent before being subjected to the action of a strong reducing agent such as a hydrosulfite salt. The hydrosulfite salt has little if any effect on the brightness of gray sedimentary Georgia Kaolin clay when used without an oxidizing agent. In the process described in U.S. Pat. No. 3,353,668 to J. B. Duke, the preferred oxidizing agent was potassium permanganate. This oxidizing agent did not per se effectively brighten the clay. Some bleaching was evident when sodium chlorite was employed as the oxidizing agent. However, with all of the oxidizing agents that were tested the major portion of the bleaching, usually essentially all of the bleaching, occurred after the reducing bleach reagent had been added to the slip of oxidized clay.

The Duke process has represented a major breakthrough in the beneficiation of the Georgia gray clays. When used in conjunction with flotation to remove colored titaniferous impurities from the clay, the process resulted in the availability of fine blue-white clays comparable in brightness to the brightest domestic and imported coating clays. A principal drawback of the process is that byproduct salts are introduced into the clay. When sufficient permanganate and hydrosulfite were used to produce a 90+ floated clay, the byproduct soluble salts adversely affected the rheology of the bleached clay. Since the particles of gray clay are extremely fine, a bleached gray clay filters slowly. It is expensive to wash the clay to an extent sufficient to remove enough salts to overcome the problem resulting from the presence of byproduct salts.

A rapid, inexpensive method for bleaching gray sedimentary kaolin clay which does not contaminate the clay with byproduct salts, or which reduced substantially the quantity of such salts, is of great importance to the clay industry.

THE INVENTION

A general object of the present invention is to provide a novel method for bleaching gray kaolin clay while the clay is in the form of an aqueous slip.

An important object of the invention is to bleach gray kaolin clay with a bleach reagent which does not per se contribute to the presence of soluble salts in the bleached clay product.

Another object of the invention is to provide a method for bleaching gray kaolin clay at a reduced reagent cost.

This invention results from the surprising discovery that gray sedimentary kaolin clay may be effectively bleached in aqueous media by ozone per se in spite of the fact that the clay has a high iron content. In the process the ozone acts on colored impurities in the clay, probably organic discolorants, without appreciably decreasing the iron content and without staining the clay by forming colored oxidized iron compounds. To the best of our knowledge, this is the first time that a clay containing both discoloring organic matter and iron in significant quantities has been successfully and practically bleached with ozone per se.

Stated briefly, in accordance with the present invention, gray kaolin clay is bleached by providing a fluid aqueous slip of the clay, preferably a substantially neutral or mildly alkaline slip of the clay, and incorporating ozone gas in the form of fine gas bubbles under the surface of the clay slip until the clay is bleached substantially. The slip is then flocculated by adding acid, thickened and washed.

The method is of benefit when applied to both unfloated and floated grades of gray kaolin clay. In both cases, the method results in bleached products of outstanding brightness and a distinctive blue-white appearance at a modest reagent cost and without introducing soluble salts.

Another advantage of the process is that the clay is bleached very rapidly and the time heretofore required to bleach gray clay with prior art bleaching reagents is reduced significantly.

In accordance with a presently preferred form of the invention, an aqueous slip of the discolored gray clay is agitated well below the surface of the slip with a rotating impeller carried on a horizontal shaft. This creates a zone of reduced pressure around the impeller. A stream of ozone gas is continuously introduced into the zone of reduced pressure in a manner such that the shearing action of the mixture of ozone and slip at the periphery of the impeller on the more slowly moving surrounding slip disperses the ozone into minute bubbles. By introducing the ozone in this manner, ozone consumption is drastically reduced as compared with the consumption required with conventional ozone-distributing means, such as gas diffusers and gas adsorption bulbs.

Because gray kaolin clay has a high iron content, usually more than 0.8 percent $Fe_2O_3$, it was surprising and unexpected that such clay could be bleached to a blue-white appearance by a strong oxidizing agent without substantially lowering the iron content, and without causing the formation of colored ferric compounds which would impart a yellow or creamy hue to the clay. The Japanese patent would have lead one skilled in the art to expect that ozone treatment of ferruginous clay must be followed by electrophoresis-electrodialysis or equivalent processing in order to remove oxidized ferruginous matter. The disclosures of the patents to Duke and Feldenheimer would suggest that an iron-contaminated clay would have to be treated with a reducing agent after the clay was treated with an oxidizing agent in order to provide high-brightness clay which did not revert to its original color.

It is postulated that ozone was effective with gray kaolin clay because a significant proportion of the iron in this particular clay is in unreactive state or condition, probably proxying for aluminum in the clay lattice. This would explain why gray sedimentary clay does not acquire a yellow color after being treated with ozone.

Some gray sedimentary kaolin clay also includes coloring matter which is decolorized to a modest degree when the clay is treated with a reducing agent. This coloring matter is believed to be a surface iron stain. When bleaching such clay, the ozone treatment may be followed by addition of a reducing bleach reagent such as zinc hydrosulfite. However, in contrast to prior bleaching processes utilizing a combination of an oxidizing agent and a reducing agent, the major brightness improvement in our process is effected by the oxidizing agent which generally increases brightness by about 2 to 6 points on the G.E. brightness scale. Only a small increase in brightness, e.g., an improvement of one-half to 1½ points, results from the action of the reducing agent.

DETAILED DESCRIPTION

The process of the invention is applicable to the treatment of sedimentary gray kaolin clays, exemplified by the hard gray kaolin clay which is found in deposits near the Fall-line in Georgia. The hard gray clay is composed of extremely fine particles. Such clay usually analyses in excess of 0.5 percent $Fe_2O_3$, usually 0.7 percent to 2 percent $Fe_2O_3$, calculated on the dry clay weight. (Dry clay weight is the weight of the clay after it has been heated to constant weight at 220° F.) With the exception of discrete iron sulfide particles, the iron in gray clay is not removed by conventional acid leach or reducing bleaches, indicating that such iron is in the clay lattice. It has been postulated that the extremely fine particle size of hard gray sedimentary clay is attributable to the presence of lattice iron which prevents the growth of large clay crystals. In addition to such iron, there may be small amounts of iron compounds staining the surface. The color of gray clay has been attributed to the presence of carbonaceous impurities. Gray sedimentary clay usually also contains up to 2 percent discrete colored titania. Small amounts of mica may be present.

Gross impurities such as large chunks or nodules of iron sulfides are usually removed from a slip of gray clay before such clay is bleached or floated and bleached.

In putting the invention into practice, the clay to be bleached must be present in the form of a fluid clay-water suspension. Suspensions of about 5 to 30 percent clay solids (weight basis) are suggested. These suspensions may contain clay dispersants and other material normally employed in clay processing. The pH of the suspension is not critical and the liquid-gas contact process of the invention is effective over a wide pH range, e.g., a pH of 2 to 11. The treatment, however, is appreciably more effective when it is carried out in neutral or slightly alkaline media. This is surprising since ozone is less stable and soluble in alkaline systems than it is in acidic media. The preferred pH during the ozone treatment is within the range of 7 to 9. The treatment is especially effective at a pH within the range of 7.0 to 7.5 in terms of the ozone input required to bleach the clay to a desired brightness value. It is fortunate that the gray clay can be efficiently bleached by the ozone with neutral or slightly alkaline slips since the pH of these slips corresponds closely to the pH of clay-water systems from hydroclassification and flotation operations. As a result, the quantity of reagents required to adjust pH for bleaching is minimized. Consequently, the quantity of byproduct salts ultimately in the clay is reduced.

The ozone that is employed may be prepared by passing air or oxygen between metal foil conductors that are connected to the terminals of an electric induction coil. Generally, about 5 to 10 percent of the oxygen is converted to ozone. There is an economic advantage to preparing the ozone by subjecting oxygen to the silent electric discharge provided that means are available to recover the oxygen from the treated clay slip.

Suitable systems for carrying out the ozonation treatment may be made by simple modification of subaeration-type flotation machines of the type employed by the ore-refining industries. The modifications include the provision of means for connecting the ozone-containing gas from the generator into the pipe normally used to introduce pressurized air below the impeller. Also, metal parts of the flotation machine which would at attacked at the pH of the ozone treatment should be replaced by resistant material such as plastics. For example, exposed copper or brass fittings and impellers should be replaced by plastic parts even when carrying out the ozone treatment with neutral clay slips.

Examples of subaeration machines which can be modified to carry out the process of the invention include those in which the impeller is provided with a hollow impeller shaft through which ozone may be admitted; those provided with a vertical pipe surrounding the impeller shaft and passing from a point above the body of slip in the machine down to the impeller zone; and those in which the ozone is forced to a point directly under the impeller. Several types of subaeration flotation machines are illustrated in "HANDBOOK OF MINERAL DRESSING," by Arthur F. Taggart, 12—63–72, published by John Wiley & Sons, Inc. (1945). Also suitable is a "Cowles Dissolver" modified to include means for introducing pressurized ozone-containing gas under the impeller.

Excellent results have been realized when the slip was ozonated at ambient temperature. It is within the scope of the invention to treat the clay slips at elevated temperature.

The pressurized gas is incorporated into the slip of gray kaolin in amount to provide from about 1 to 15 pounds ozone per ton of clay. The preferred amount is within the range of 3 to 10 pounds ozone per ton of clay. With less than 3 pounds of ozone per ton of clay, the brightness of the clay product may not be sufficiently high. Economic considerations dictate the preferred upper limit of about 10 pounds ozone per ton of clay.

After the ozone-air or ozone-oxygen mixture has been incorporated into the fluid clay slip for a time sufficient to incorporate a desired quantity of ozone, the slip must be flocculated to a pH within the range of about 2 to 4 by addition of an acidic material unless the slip is already sufficiently acidic. An acidic material such as sulfuric acid, sulfur dioxide or aluminum sulfate is employed.

With some clays, markedly better results are obtained when the ozone treated slip is flocced to a pH within the range of 3 to 4 than when the slip is flocced to lower pH values.

After acidification, the flocculated slip is thickened by decanting supernatant liquid. The thickened slip is then filtered and washed.

The filter cake may be dried in conventional drying equipment such as a rotary drier. Alternatively, the cake may be fluidized by adding a clay dispersant such as ammonium hydroxide or a sodium-condensed phosphate salt. The fluidized slip is then dried in a spray drier to produce a predispersed clay product.

Gray sedimentary kaolin clays usually include discrete colored (yellow or yellow-brown) titaniferous impurities in addition to organic and ferruginous matter. To obtain 90+ brightness kaolin products, the discrete titaniferous impurities should be removed at least partially from the clay. Flotation in the presence of an anionic collector reagent selective to the titania impurity is recommended. Some deposits of gray clay also contain a discrete ferruginous impurity (generally an iron sulfide). The discrete ferruginous matter may be removed prior to bleaching when it is sufficiently coarse. Very fine discrete iron sulfide usually reports with the titaniferous impurity and is removed from the clay when the clay is beneficiated by flotation. However, even when the flotation is very efficient and the titania level is reduced below about 0.5 percent, gray kaolin clay still has a high iron content, e.g., about 0.8 percent $Fe_2O_3$. This residual impurity is not removed by an acid leach, a reducing agent or an oxidizing agent. Ozone treatment may be carried out before or after flotation treatment.

EXAMPLES

The following examples are given for illustrative purposes.

Clay brightness values referred to herein refer to values obtained with a G.E. Brightness Meter following the procedure described in TAPPI Standard T646-m-54. This method compares the reflectance of a band of light having a wavelength of about 457 millimicrons for the test sample with the reflectance of light of the same wavelengths by a pure magnesium oxide standard, thereby giving a quantitative indication of the brightness of the test sample.

EXAMPLE I

Bleaching Flotation Beneficiated Gray Kaolin Clay

The slip of gray kaolin used in bleaching tests to be described was a thickened slip of flotation beneficiated gray kaolin clay which had been obtained by the following steps.

Crude hard clay from the Prim property in Wilkinson County, Ga., was pulverized to a maximum lump size of about one-half inch. The pulverized clay was mixed with water at about 30 percent solids in an intensive mechanical blunger. The blunged clay was deflocculated by adding sodium carbonate and then adding a hydrosol formed by adding aluminum sulfate to diluted "O" sodium silicate. The deflocculated slurry was degritted and centrifuged. The centrifuge was operated under conditions calculated to produce as an effluent a fine size fraction of gray kaolin clay containing about 95 percent by weight of particles finer than 2 microns (equivalent spherical diameter) and 90 percent by weight of particles finer than 1 micron. The slip was diluted to about 20 percent solids and conditioned for the selective flotation of colored impurities (principally a yellowish titaniferous mineral) with minus 325-mesh calcite, ammonium sulfate and an emulsion of ammonium hydroxide, tall oil and a solution of neutral petroleum sulfonate in mineral oil. The pH of the conditioned pulp was 8.5.

The pulp was given one rougher flotation and the froth was cleaned three times.

The combined machine discharge from the flotation cells contained the purified but discolored gray kaolin clay and had a pH of 8 and a solids content of 8 percent. The machine discharge was thickened to 21 percent solids in the flotation plant by adding sulfuric acid to a pH of 2.5 and decanting supernatant liquid.

To prepare the thickened machine discharge product for bleaching at a solids level characteristic of the slip as discharged from the flotation cells, the slip was rediluted to 8 percent solids by adding water and the pH increased to 7.2 by adding a small amount of sodium hydroxide. (If the slip had been ozonated without preliminary thickening, less salt byproduct would be present with the clay since the use of the caustic to increase pH would have been avoided.)

Ozonation was carried out in a modified Airflow subaeration flotation cell capable of holding about 4 liters of unaerated charge. The cell was provided with a polyethylene impeller and plastic fitting to obviate corrosion. The upper end of the hollow vertical shaft carrying the horizontal impeller was connected through inert plastic hosing to an ozone generator. The hose was provided with a valve to control the flow of gas from the generator into the hollow shaft.

The ozone was produced as an ozone-air mixture from a generator under a pressure of 7 pounds per square inch. The ozone concentration in the gas mixture was about 1 to 4 percent by weight.

The open cell was charged with 3,600 g. of a slip of discolored clay and the impeller was rotated at a speed of about 2,000 r.p.m. While the impeller was in operation, gas from the generator was charged to the hollow shaft of the impeller which dispersed the gas in the clay slip. The ozone was fed to the slip for a time calculated to charge a precalculated quantity of ozone to the slip. For example, to charge the slip with 6 pounds of ozone per ton of clay, the ozone-air mixture was continuously fed into the slip for 27 minutes.

After the ozone gas had been admitted into the slip for a time calculated to provide the desired ozone input, the slip was removed from the flotation cell. Sulfuric acid was added to the slip as a solution of 5 percent concentration until the pH of the slip reached a predetermined level (a pH of 2.5 or 3.5). The slip was flocculated as a result of the acid addition. The flocs were permitted to settle and supernatant was decanted, resulting in a thickened clay slip. One portion of each thickened slip was filtered with Buchner funnels and the filter cakes were washed once with distilled water. The cakes were then oven dried at about 175° F. and pulverized for brightness testing.

For the purpose of determining whether a further improvement in brightness could be obtained by employing a reducing bleach treatment as a supplement to the ozone bleach treatment, a portion of several of the ozone-treated, thickened slips was treated with various quantities of zinc hydrosulfite bleach liquor at the 2.5 pH conventionally used in bleaching kaolin clay. When treating slips with zinc hydrosulfite, the slip was divided into several portions and different quantities of bleach liquor were used in order to determine optimum quantity for the particular slip.

For purposes of comparison, a sample of the slip of beneficiated gray kaolin was flocced to a pH of 2.5 with sulfuric acid, thickened, filtered, washed and dried. The product was used as a control. Results are summarized in table form.

BLEACHING FLOTATION BENEFICIATED GRAY KAOLIN CLAY WITH OZONE

| $O_3$ #/ton input | Flocculatad at pH | Clay brightness, percent | | | | |
|---|---|---|---|---|---|---|
| | | $ZnS_2O_4$ #/ton 0 | $ZnS_2O_4$ #/ton 3 | $ZnS_2O_4$ #/ton 6 | $ZnS_2O_4$ #/ton 10 | $ZnS_2O_4$ #/ton 15 |
| 0 (control) | 2.5 | 87.4 | | | | |
| 2 | 2.5 | 89.5 | 89.7 | 89.5 | 90.0 | 90.5 |
| | 3.5 | 89.7 | | | | |
| 4 | 2.5 | 90.3 | 90.4 | 91.0 | 90.9 | 91.0 |
| | 3.5 | 90.7 | | | | |
| 5 | 2.5 | 90.1 | 90.6 | 90.8 | 90.4 | 90.4 |
| | 3.5 | 90.5 | | | | |
| 6 | 2.5 | 90.7 | 91.0 | 91.6 | 91.3 | 91.5 |
| | 3.5 | 91.2 | | | | |

The data summarized in the table show that the ozone treatment per se followed by acid treatment was highly effective in bleaching the flotation beneficiated gray clay when employed in amounts within the range of 2 to 6 pounds per ton clay. Using only 2 to 3 pounds per ton ozone, products having a brightness values close to 90 percent were obtained. With 4 to 6 pounds per ton ozone per se and acid treatment, the products had 90—percent plus brightness values.

The data in the table show also that with this particular floated sample of gray kaolin the ozone treatment was generally considerably more effective when the acid treatment following the ozone bleach treatment was carried out at a pH of 3.5 rather than the 2.5 conventionally used in thickening kaolin slips for bleaching and filtration purposes. Thus, when the slips were treated with ozone as the sole bleaching reagent and were flocculated at a pH above 2.5, products close to 91 percent brightness were obtained with an input of only 4 to 6 pounds of ozone per ton of clay in the slip.

A comparison of the brightness data for slips bleached by ozonation followed by acid treatment with results for bleaching with ozone supplemented by conventional zinc hydrosulfite reducing bleach showed that at best, there was only a very modest further improvement as a result of the use of the reducing bleach. For example, there was only a 0.7 percent further improvement in brightness as compared to results obtained with 4 pounds per ton ozone and flocculation at a pH of 2.5. Moreover, to obtain a further improvement in brightness of only 0.7 percent 6 pounds per ton zinc hydrosulfite bleach reagent was required.

The data therefore show that small amounts of ozone were extremely effective in bleaching flotation beneficiated gray clay at a pH of 7.2 and that the ozone treatment was especially effective when followed by an acid floccing step at a pH above 2.5.

To point out the economic advantages of using ozone as a bleach for flotation beneficiated gray kaolin clay, it will be noted that in order to produce a 91.4 percent brightness product from the same slip of flotation beneficiated gray kaolin by an oxidation-reduction bleach using potassium permanganate and zinc hydrosulfite at a pH of 2.5, as described in said patent to Duke, the permanganate had to be employed in amount of 10 pounds per ton and the zinc hydrosulfite in amount of 15 pounds per ton. As shown in the table, a 91.2 percent brightness product was obtained with only 6 pounds per ton ozone input with floccing at a pH of 3.5. On the basis of present costs for all of the bleach reagents used in the two processes, the ozone bleaching was carried out at one-sixth the reagent cost required with the prior art oxidation-reduction bleach treatment.

Also, bleaching with 6 pounds per ton ozone required only 27 minutes, as compared to a total of several hours with the prior art bleach.

As an additional advantage, the only salts introduced with the ozone bleach were the salts formed by the reaction of acid flocculating agent with alkali already present in the slip of flotation beneficiated clay. With the prior art bleach treatment, these salts were also formed. However, in addition to these salts, manganese and zinc salts were also incorporated with the clay.

Thus, the process of the invention represented an improvement over the prior art bleach treatment in terms of both economics and product quality.

EXAMPLE II

Bleaching Unfloated Gray Kaolin Clay

The starting clay used in the bleaching tests in this example was a slip of degritted, fractionated gray clay. The clay had been prepared by pulverizing a sample of hard kaolin clay (Prim), blunging at about 30 percent solids, deflocculating the blunged clay by adding sodium carbonate and "O" sodium silicate, degritting and centrifuging to produce an effluent composed of particles having substantially the same particle size distribution as the clay in the centrifuge effluent of example I.

The slip contained 28 percent clay solids and had a pH of 8.1. A sample of the slip was flocced to a pH of 2.5, filtered, washed and pulverized. This sample, the control, had a brightness of 81.5 percent.

The pH of the remainder of the slip of fractionated gray clay was reduced to 7.2 by addition of a solution of sulfuric acid.

Portions of the clay slip were then treated with ozone in a 2-gallon stainless steel bucket. Stainless steel tubing, about ½-inch diameter, was secured to an inner sidewall of the bucket and extended from the top to the bottom of the bucket. At the bottom of the bucket, the open steel tubing was bent upwardly and terminated near the center of the bucket about an inch from the base. The top of the tubing was connected to an ozone generator. A 3-inch diameter Cowles impeller blade mounted on the shaft of a drill press was secured above the bucket with the impeller above the open end of the bend in the tubing.

A charge of 5,550 g. of the slip of fractionated unfloated gray clay was placed in the bucket. With the Cowles impeller operating at 4,600 r.p.m., an ozone-air mixture was introduced under a pressure of 7 pounds per square inch through the tube below the blade of the impeller. The gas was charged to the slip for two hours at a rate of 2.0 liters of gas (air and ozone) per minute. Ozone concentration in the gas was 26 mg./l. and the ozone input to the clay slip was therefore 10 pounds per ton of dry clay. A portion of the ozone-treated slip was flocced by adding sulfuric acid solution to a pH of 2.5 and the flocced slip was thickened and filtered. The filter cake was rinsed with 2 parts by volume of deionized water to 1 part by volume filter cake. The cake was dried and pulverized. The specific resistance of a portion of the cake was measured and found to be $2.63 \times 10^4$ ohm-cm. The high resistance value indicates that the clay had a low soluble-salt content.

Another sample of the cake of ozone-treated clay was tested for brightness. The clay product had a brightness of 86.3 percent, representing a 4.8 point improvement over the starting clay.

Another portion of the ozone-treated slip was flocced to a pH of 3.5 by addition of sulfuric acid solution and thickened. A portion of the thickened slip was filtered, washed as described above, dried and pulverized. This clay had a brightness of 85.8 percent, slightly less than that of ozonated clay that had been flocced to a pH of 2.5.

Other portions of the thickened slip of ozone-treated clay which had been flocced to a pH of 3.5 were treated with varying quantities of zinc hydrosulfite bleach liquid. Optimum further increase in brightness of the flocced, ozone-treated clay was with 6 pounds per ton $ZnS_2O_4$. The resulting product brightness of 87.4 percent, indicating that the clay had been brightened 4.3 points by ozone treatment and further brightened 1.6 points by hydrosulfite bleaching.

We claim:

1. A method for improving the brightness of sedimentary gray domestic kaolin clay containing an organic impurity and a ferruginous impurity which is not removable from the clay by leaching with acid which consists essentially in providing a fluid aqueous slip of said clay and incorporating ozone into said slip in the form of small bubbles until substantial bleaching takes place.

2. The method of claim 1 wherein ozone is the sole bleaching reagent that is employed in brightening said clay.

3. The method of claim 1 wherein said gray kaolin clay in said slip is the machine discharge product of a froth flotation process in which colored titaniferous impurities in said clay are floated from said clay in the presence of fatty acid collector reagent selective to the flotation of said colored impurities, leaving purified discolored gray kaolin clay in the machine discharge product.

4. A method for improving the brightness of gray domestic sedimentary kaolin clay containing an organic impurity and ferruginous impurity which is not removable from the clay by leaching with acid which comprises providing a fluid dispersed aqueous slip of said clay, incorporating ozone into said slip in the form of small bubbles until substantial bleaching takes place and, without removing discrete ferrinous matter, flocculating the slip of clay by adding acidic material, removing water from the flocs and recovering bleached kaolin clay which is brighter than the clay was before ozone treatment but which has essentially the same iron analysis as the clay had before the ozone treatment.

5. A method for improving the brightness of sedimentary gray-colored domestic kaolin clay containing an organic impurity and a ferruginous impurity which is not removable from the clay by leaching with acid which has been purified by subjecting an aqueous pulp of the clay to froth flotation in a mildly alkaline circuit in the presence of a fatty acid flotation reagent selective to the flotation of colored titaniferous impurity particles in said clay, producing a froth which is a concentrate of said impurity and a machine discharge which is a dilute, mildly alkaline dispersion of purified, gray-colored clay, said method for improving the brightness of said clay consisting essentially of continuously incorporating ozone in the form of finely divided bubbles below the surface of said dilute slip of purified gray-colored clay at a pH within the range of 7 to 9 until the clay is brightened substantially, flocculating said slip by adding an acid thereto, thickening the slip by decanting water therefrom, and filtering and washing the thickened slip.

6. The method of claim 5 wherein said gray kaolin analyzes at least 0.8 percent $Fe_2O_3$ before and after said ozone treatment and acid flocculation.

7. The method of claim 5 wherein ozone is incorporated in amount within the range of 1 to 10 pounds per ton of said clay.

8. A method for brightening sedimentory gray domestic kaolin clay containing an organic impurity and a ferruginous impurity which is not removable from the clay be leaching with acid which comprises providing a fluid aqueous slip of said clay in the form of a body of substantial depth, while agitating said slip with an impeller agitator located near the bottom of said slip, incorporating pressurized ozone gas into said slip below the impeller agitator, whereby said gas is dispersed into minute bubbles at a point substantially below the surface of said slip, and continuing to incorporate said gas into said slip in this manner until said clay is brightened to a desired value.

9. A method for improving the brightness of sedimentary gray-colored domestic kaolin clay containing an organic impurity and a ferruginous impurity which is not removable from the clay by leaching with acid which has been purified by subjecting an aqueous pulp of the clay to froth flotation in an alkaline circuit in the presence of a fatty acid flotation reagent selective to the flotation of particles of a colored titaniferous impurity in said clay, producing a froth which is a concentrate of said impurity and a machine discharge which is an alkaline aqueous dispersion of purified, gray-colored clay, said method for improving the brightness of said clay comprising continuously incorporating ozone in the form of finely divided bubbles below the surface of said aqueous dispersion of purified gray-colored clay at a pH within the range of 7 to 9 until the clay is brightened substantially, flocculating said dispersion of clay by adding an acid thereto, further bleaching the clay with a reducing agent, and filtering and washing the bleached clay.

10. A method for improving the brightness of sedimentary gray-colored domestic kaolin clay containing an organic impurity and a ferruginous impurity which is not removable from the clay be leaching with acid which has been purified by subjecting an aqueous pulp of the clay to froth flotation in a mildly alkaline circuit in the presence of a fatty acid flotation reagent selective to the flotation of colored titaniferous impurity particles in said clay, producing a froth which is a concentrate of said impurity and a machine discharge which is a dilute, mildly alkaline dispersion of purified, gray-colored clay, said method for improving the brightness of said clay consisting essentially of continuously incorporating ozone in amount within the range of 1 to 10 pounds per ton of clay in the form of finely divided bubbles below the surface of said dilute slip of purified gray-colored clay at a pH within the range of 7 to 9 until the clay is brightened substantially, flocculating said slip by adding an acid thereto, thickening the slip by decanting water therefrom, and filtering and washing the thickened slip, said gray kaolin clay analyzing at least 0.8 percent $Fe_2O_3$ before and after said ozone treatment and said flocculation, and said ozone being the sole bleach reagent.